UNITED STATES PATENT OFFICE.

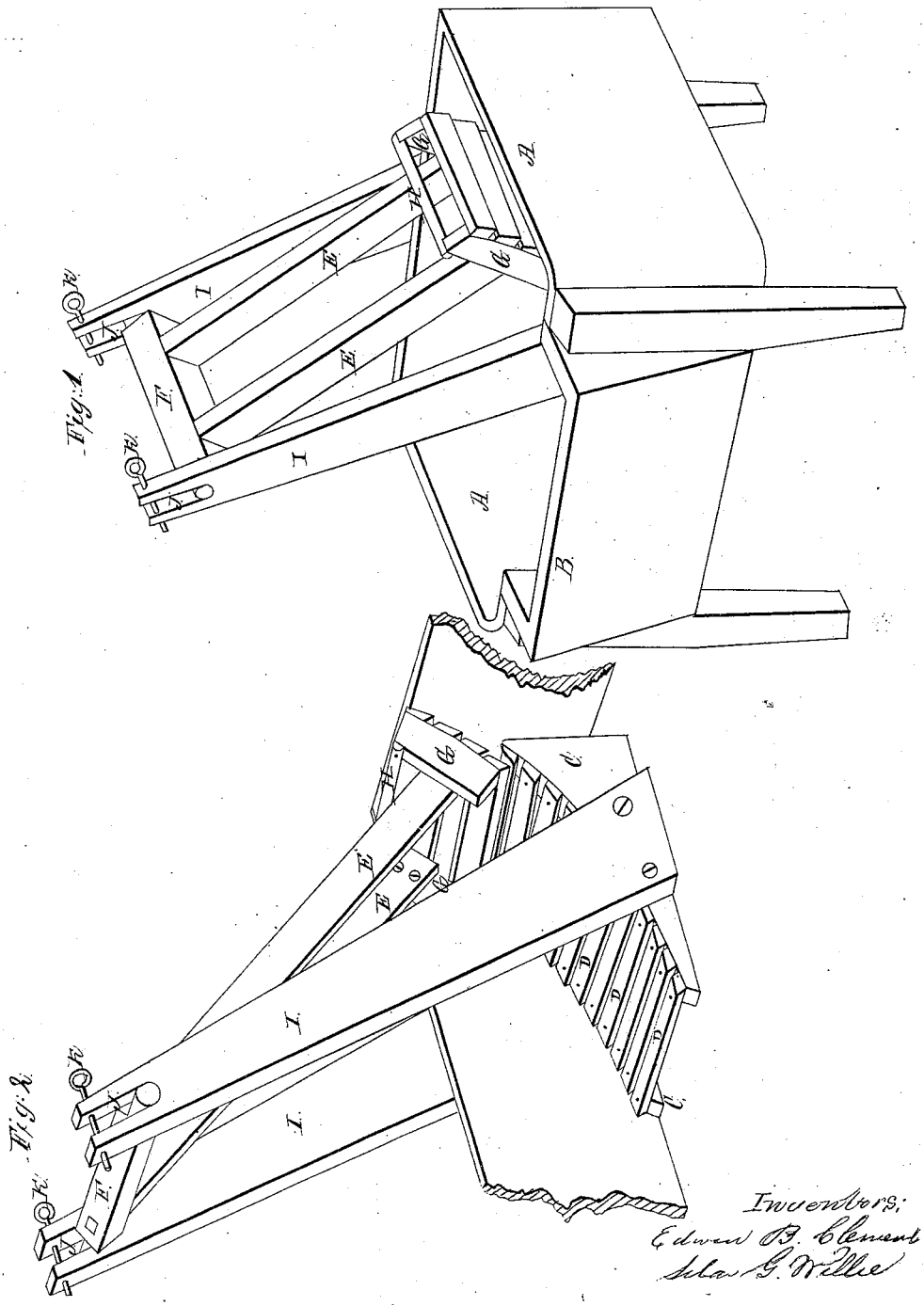

EDWIN B. CLEMENT AND SILAS G. WILLIE, OF BARNET, VERMONT.

WASHING-MACHINE.

Specification of Letters Patent No. 14,391, dated March 11, 1856.

*To all whom it may concern:*

Be it known that we, EDWIN B. CLEMENT and SILAS G. WILLIE, of Barnet, in the county of Caledonia and State of Vermont, have invented a new and useful Improvement in Washing-Machines; and we do hereby declare that the following is a full and exact description thereof, reference being had to the accompanying drawings and to the letters of reference marked thereon.

The nature of our invention consists in shaping the rubbers like the teeth of a splitting saw, so that the article to be washed will be carried through between them without being wadded together, thereby enabling the operator to wash with ease, neatness, and despatch.

To enable others skilled in the art to make and use our invention we will now proceed to describe its construction and operation.

We construct our tub see letters A A, Figure 1, in the accompanying drawing, two and one half feet long, two feet wide and one foot deep, the corners rounded or square being immaterial, one side flaring out see letter B, the inside of which is fluted like a common washboard, which may be used or not. A rubber is made fast to the bottom of this tub, at the opposite side from the fluted board, midway from the ends of the tub. This stationary rubber is composed of two or more bedpieces, fifteen inches long, seven or eight inches wide at one end, and one inch at the other, see letters C, C. The top of these bedpieces are concaved on a circle of four feet in diameter, one of which is fastened at one side of the tub, the other one foot more or less, from it, near the center. On these bedpieces are fastened a sufficient number of slats each slat being three fourths of an inch wide, by one half inch thick, beveled each way from the rubbing corner so as to resemble the teeth of a splitting saw see letters D, D, D. A vibrating rubber is made to fit the stationary one, composed of two arms see letters E, E, one end of each arm being connected with a roller, see letter F. On each of the other ends of these arms a foot is fastened, ten or twelve inches long by three inches wide convex on the bottom, to correspond with the concavity of the stationary rubber, see letters G, G. On these feet are fastened slats like the former described ones. A bar is made fast to the upper edge of these feet at the ends, for a handle to be grasped by the operator, see letter H. This vibrating rubber rests on the bearing ends of the roller F, in two ports, see letters I, I. One of these ports is fastened to the outside of the tub, the other to the side of the stationary rubber. A slot is made in the upper end of these ports, five or six inches long, in which the bearing of the roller F, is made to fit see letters J, J. A pin is put through the upper ends of these ports to prevent the vibrating rubber from being lifted out when in operation see letters K, K. The ports I, I, must be set so as to have the slots J, J, range with the center of the stationary rubber.

We come now to the operation. Swing the vibrating rubber from the operator, place one end of the article to be washed on the highest part of the stationary rubber, grasp the handle H and lift the vibrating rubber, swing toward the operator so that the forward end will catch the article, then press it down and rub forward and back. The vibrating rubber will carry the article along with it, rubbing it on the stationary rubber, and when it is swung back, the stationary rubber holds the article while the vibrating rubber rubs back, and so on until the article is carried through, making (in our opinion) the most simple, cheapest, easiest operated, and most efficient washing machine extant.

What we claim as our invention, and desire to secure by Letters Patent, is—

The saw teeth shaped rubbers D, D, made and operating substantially as described.

EDWIN B. CLEMENT.
SILAS G. WILLIE.

Witnesses:
A. J. LAISEL,
GEO. DAMON.